July 4, 1933.  E. H. BRISTOL  1,917,092
CONTROL SYSTEM
Filed Jan. 24, 1931
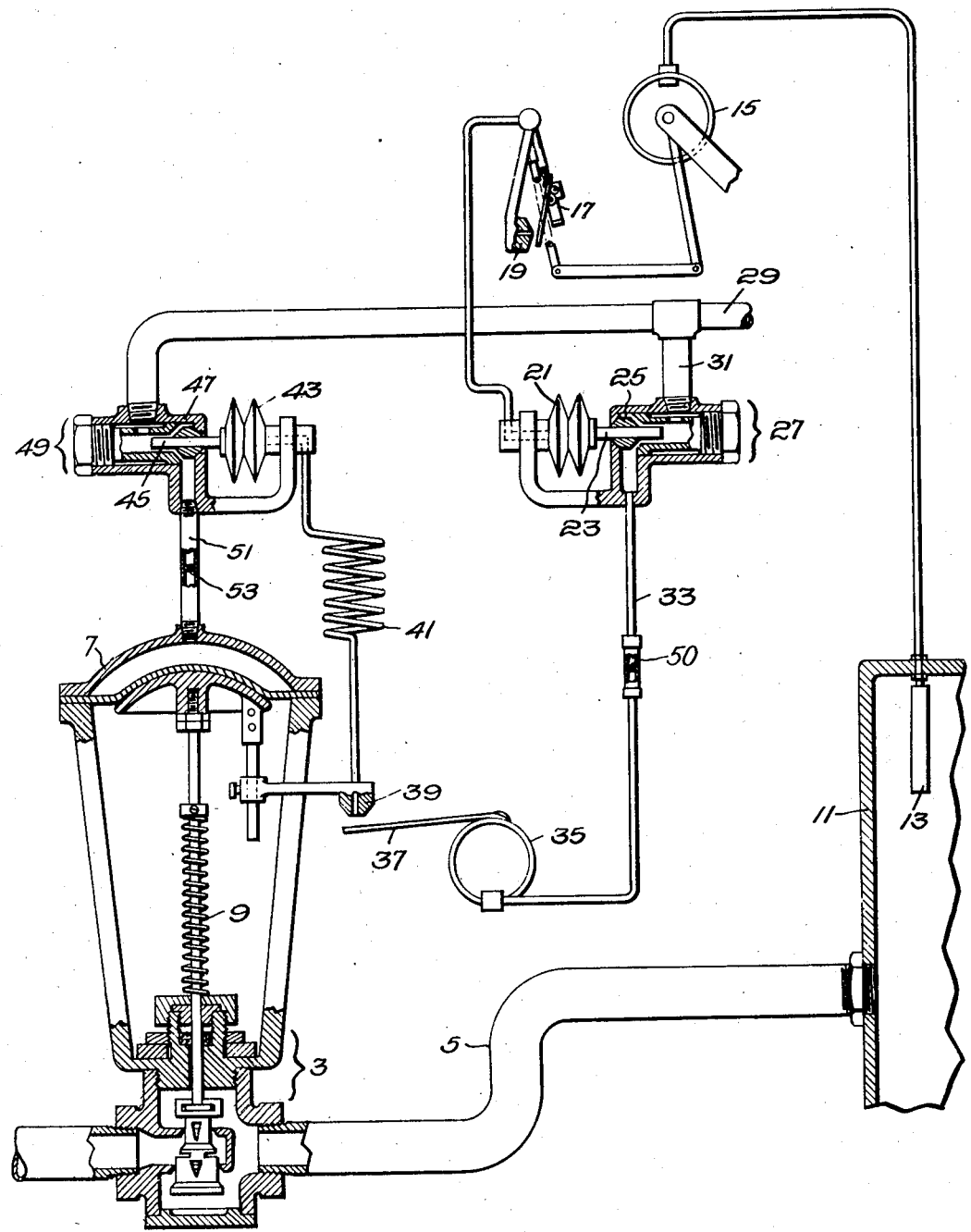
Inventor:
Edgar H. Bristol, Patented July 4, 1933

1,917,092

UNITED STATES PATENT OFFICE

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS

CONTROL SYSTEM

Application filed January 24, 1931. Serial No. 510,926.

REISSUED

This invention relates to control systems which embody a valve or similar mechanism operated by a servo-motor, and the object is to provide improvements in such a system whereby more uniform results may be attained and the effect of mechanical factors, which in previous constructions have adversely influenced the accurate functioning of the mechanism, may be obviated.

My invention may be well understood by reference to the following description of an illustrative embodiment thereof taken in connection with the accompanying drawing, wherein I have shown diagrammatically and partly in section a system of the type wherein a valve is operated by a pneumatic motor thermostatically controlled.

Referring to the drawing, I have there shown a valve 3 adapted to control the flow of some fluid, such as steam, through the pipe 5, the valve being operated by a diaphragm motor 7. The valve herein shown is of the type which is opened by pressure in the motor and closed by the spring 9 when the pressure is relieved. It is adapted to float in partly open positions in accordance with the pressure existing in the motor. Friction on the valve stem resists movement of the valve and in prior constructions in which the pressure admitted to the motor was proportional to temperature or some other controlling variable, the valve might take different positions accordingly as whether the pressure was increasing to a certain value or decreasing. In accordance with my invention I provide a construction wherein substantially identical positions of the valve correspond to a given pressure under all circumstances.

The system shown in the drawing may be supposed to be utilized to maintain a constant temperature in the interior of tank 11 as measured by a suitable thermometric device including the bulb 13 in the tank communicating with a suitable responsive device; as, for instance, the helical Bourdon tube 15 like that shown in the patent to Bristol 1,195,334, dated August 22, 1916. The responsive device 15 may operate one element of a control couple such as the valve or "flapper" 17 which cooperates with a companion element and takes the form of a ported member or "nozzle" 19 which, through the diaphragms 21 and the hollow stem 23 of a double valve 25, provides a communication to atmosphere for the interior of a control head 27 of the supply and waste type. This mechanism is in principle like that described in the patent to Johnson 542,733, dated July 16, 1896, and in detailed construction may be and preferably is similar to that shown in the patent to Dixon 1,582,868, dated April 27, 1926, while the "flapper" is preferably of the throttling type disclosed in my Patent 1,641,744, dated Sept. 6, 1927.

The valve 25 in the position shown controls the flow of pressure fluid from a supply line 29 through branch 31 to pipe 33. Hitherto it has been customary to permit the air to flow directly to the servo-motor operating the valve. Herein on the contrary pipe 33 leads to a motor 35, herein shown as a helical Bourdon tube or pressure gage adapted to be distorted more or less as the internal pressure varies and carrying on its free end an element of a control couple in the form of a valve or "flapper" 37. The cooperating element consisting of a ported member or "nozzle" 39 is caused to move proportionately to the movements of the valve 3 and herein is shown as mounted directly thereon to reciprocate therewith. The ported member may be in communication through the flexible coil 41, which serves to permit it to move freely, through diaphragms 43 and the hollow stem 45 of a double valve 47 with the interior of control head 49 of the supply and waste type which is interposed between the supply line 29 for air under pressure and conduit 51 leading to the motor 7.

The parts being in the position shown, flapper 17 is raised from its seat on nozzle 19 and air entering the control head at pipe 31 bleeds through the hollow stem 33 and exhausts to atmosphere through the nozzle. Diaphragms 21 are collapsed, valve 25 is in the position shown and air flows through pipe 33 to the motor tube 35, which, being distended, holds flapper 37 away from the ported member 39. Similarly air entering control head 49 from the main line bleeds through hollow stem 45, diaphragms 43 and pipe 41 to atmosphere through nozzle 39. The valve 47 is maintained in the position shown and air passes to the valve motor maintaining the valve in open position.

Now, as the temperature in the tank 11 increases, the responsive element 15 is operated and permits valve or flapper 17 to close the port in 19. Pressure builds up in diaphragms 21, valve 25 is shifted to the left, cutting off communication between 33 and 31 and permitting the motor 35 to exhaust to atmosphere through pipe 33 and the port opened at the left of the valve 25. Flapper 37 therefore closes against the ported member or nozzle 39, pressure builds up in diaphragms 43, valve 47 is shifted toward the left, cutting off the supply of pressure fluid to the diaphragm motor 7 and permitting the latter to exhaust to atmosphere through pipe 51 and the port opened by valve 47 at its right. The valve 3 is thus released to the spring 9 and closes. As the valve moves upward in its closing movement, nozzle 39 is moved away from valve 37. When these parts are separated, the parts of control head 49 resume the position illustrated.

It will thus be seen that the thermometric device 15 and control head 27 with its control couple 17 and 19 establish a certain pressure in motor tube 35 corresponding to a given temperature and that to any pressure in motor tube 35 there will correspond a position of nozzle 39 and with it of the valve and its stem, this position being brought about by a pressure applied through control head 49 to diaphragm motor 7, which pressure in the motor 7 may or may not be identical with the pressure in 35.

A gradual change in pressure in motor 35 is attained when flapper 17 is of the throttling type described in my Patent 1,641,744 above referred to. Alternatively or in conjunction therewith I may utilize a restriction 50 in pipe 33 which permits only a slow seepage of air therethrough.

I prefer to provide for a gradual flow of energy to and from the valve operating motor 7 in response to a governing action of the mechanism, and herein I have shown pipe 51 as provided with the restriction 53 for damping the flow of air therethrough. In the absence of such restriction the motor may tend to pulsate because of the fact that the resistance to initial movement of the valve is greater than the sliding friction of the valve stem once the motion has begun. In many cases pulsation is undesirable. Furthermore, in cases where the control couple separates completely it is possible that a sudden impulse of air under full pressure may be applied, tending to open the valve, and before this can be released, the valve may have moved beyond its desired position. The use of a restriction 53 corrects this.

While I have for purposes of clearness and by way of illustration described a pneumatically operated valve thermostatically controlled, I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a valve having a pressure-fluid-operated motor for operating the same, means controlling the supply of pressure fluid to the motor comprising a valve mechanism of the supply and waste type, a control couple therefor, the relative approach and recession of the elements of which govern the said valve mechanism, one element of which couple is moved proportionately to movement of said valve, the relative position of said elements being further controlled by a pressure-fluid-operated device, means controlling flow of fluid to said device comprising a valve mechanism of the supply and waste type and a control couple, and means responsive to the fluctuations of a variable condition for relatively positioning the elements thereof.

2. In combination with a motor-operated valve comprising a control couple, the relative approach and recession of the elements of which govern the supply of energy to the motor, one element of the couple moving proportionately to the valve, a tube subject to distorting internal pressure connected to one of said elements for further controlling the relative positions of the same, and means to admit pressure fluid to said tube comprising a fluid pressure control mechanism of the supply and waste valve type including a control couple, one element of which affords a port to atmosphere and the other a valve for said port, the relative approach and recession of said elements governing the pressure in the system, and means responsive to the fluctuations of a variable for relatively positioning the elements of said second couple.

3. In combination with a motor-operated valve comprising a control couple, the relative approach and recession of the elements of which govern the supply of energy to the motor, one element of the couple moving proportionately to the valves, a pressure-fluid-operated motor for moving the other element, and means controlling the flow of fluid thereto comprising a valve mechanism of the supply and waste type, a control couple therefor, the relative approach and recession of the elements of which govern the said mechanism, and means responsive to the fluctuations of a variable condition for relatively positioning the elements thereof.

4. In combination with a valve having a pressure-fluid-operated motor for operating the same, a conduit for the fluid having a restriction for dampening the flow to and from the motor means, means controlling the flow of fluid through the conduit comprising a valve mechanism of the supply and waste type, a control couple therefor, the relative approach and recession of the elements of which govern the said valve mechanism, one element of which couple is moved proportionately to movement of said valve, the relative position of said elements being further controlled by a motor, a second control couple, the relative approach and recession of the elements of which govern the supply of energy to said latter motor, and means responsive to the fluctuations of a variable condition for relatively positioning the elements of said second couple.

In testimony whereof, I have signed my name to this specification.

EDGAR H. BRISTOL.